US005267172A

United States Patent [19]

Vermesse

[11] Patent Number: 5,267,172

[45] Date of Patent: Nov. 30, 1993

[54] MAIL FRANKING MACHINE INCLUDING AN INTERFACE APPLICATION SPECIFIC INTEGRATED CIRCUIT

[75] Inventor: Bernard Vermesse, L'Hay les Roses, France

[73] Assignee: Alcatel Satmam, Bagneux, France

[21] Appl. No.: 725,727

[22] Filed: Jul. 3, 1991

[30] Foreign Application Priority Data

Jul. 4, 1990 [FR] France ............................... 90 08489

[51] Int. Cl.[5] ...................... G06F 15/20; G06G 7/188

[52] U.S. Cl. .......................... 364/464.02; 364/464.01; 364/464.04

[58] Field of Search ...................... 364/464.01, 464.02, 364/464.03, 464.04; 101/91; 235/101; 318/685, 568.2, 565, 563; 395/84, 86, 87, 95; 226/16, 33; 901/23

[56] References Cited

U.S. PATENT DOCUMENTS 3,692,988 9/1972 Dlugos et al. .................. 364/464.03
3,904,946 9/1975 Dlugos et al. ...................... 318/685
4,090,063 5/1978 Martin .................................. 101/91
4,519,048 5/1985 Abellana et al. .................... 364/900
4,525,785 6/1985 Soderberg et al. ............ 364/464.02
4,630,210 12/1986 Salazar et al. .................. 364/464.02
4,635,205 1/1987 Eckert, Jr. et al. ............ 364/464.02
4,897,793 1/1990 Knoth ............................ 364/464.03
4,942,394 7/1990 Gasiunas ............................... 101/91
5,121,327 6/1992 Salazar ........................... 364/464.02
5,128,875 7/1992 Abumehdi et al. ............ 364/464.02

*Primary Examiner*—Jack B. Harvey
*Assistant Examiner*—Hal D. Wachsman
*Attorney, Agent, or Firm*—Sughrue, Mion, Zinn, Macpeak & Seas

[57] ABSTRACT

A mail franking machine which prints stamps and totals stamp values comprises a motor and drums carrying digits in relief for printing a stamp. A microprocessor controls the motor and totals the values of stamps printed. Position encoders connected to respective drums translate into binary words the values of the digits printed on the stamp and the states of manually operable switches. Interfaces essentially formed by an application specific integrated circuit include circuits for receiving and executing an instruction to start or stop the motor or a single instruction to scan and transmit the values translated by all the encoders and the states of all the switches.

6 Claims, 4 Drawing Sheets

MAIL FRANKING MACHINE INCLUDING AN INTERFACE APPLICATION SPECIFIC INTEGRATED CIRCUIT

BACKGROUND OF THE INVENTION

1. Field of the invention

The invention concerns a mail franking machine which prints stamps and totalizes the value of said stamps.

2. Description of the prior art

A conventional machine of this kind comprises:

a motor and drums carrying digits in relief for printing a stamp;

a microprocessor for controlling said motor and for totalling the values of stamps printed;

position encoders connected to respective drums to translate into binary words the values of the digits printed on the stamp;

manually operable switches;

a first interface controlled by instructions from said microprocessor for scanning and transmitting to said microprocessors said values translated by said encoders and the states of said switches;

a first interface controlled by instructions from said microprocessor for scanning and transmitting to said microprocessors said values translated by said encoders and the states of said switches;

a second interface controlled by instructions from said microprocessor for switching the power supply of said motor.

It is known to divide these subsystems between two printed circuit boards. A main board carries the microprocessor and a first part of the second interface. An interface board carries the first interface, the position encoders, the switches and a second part of the second interface. The two boards are connected by five-way connectors carrying: a reference potential, an electronic circuit power supply potential, a motor control signal and a two-wire serial transmission bus using the I2C protocol, for example. The microprocessor controls transactions between the two boards. One bus line carries clock pulses timing transmission and the other carries binary data in either direction. The bus carries instructions which command scanning and transmission of the values translated by the encoders and the states of the switches, and transmits data in response to such instructions.

The first interface comprises two general purpose integrated circuits available through ordinary commercial channels: a serial input-output circuit and a decoder. These circuits are used to scan a matrix of conductors in which the encoders and the switches set up variable connections between rows and columns. The want of outputs on these circuits makes it necessary to use twelve diodes to connect six outputs of the decoder to the twelve columns of the matrix without compromising the independence of the columns.

The second interface switches the motor power supply and comprises an address decoder and a latching register on the main board and a power transistor and a pre-amplifier transistor on the interface board. The motor control line carries a DC voltage provided by an output of the latching register and controlling the pre-amplifier transistor directly. One implementation of a prior art machine interface board will be described in more detail later.

The interface board of a prior art machine has the advantage of using only generally available general purpose integrated circuits. Their number is small (two) but it is desirable to reduce the number to reduce the manufacturing cost of the machine (printed circuit, assembly, inspection cost). It is not possible to reduce the number of integrated circuits using a single commercially available integrated circuit as there is no general purpose integrated circuit available to provide all of the functions of the first interface and some or all of the functions of the second interface. It is therefore necessary to consider the use of an application specific integrated circuit (ASIC). It is possible to integrate into a single integrated circuit the twelve diodes, the serial input-output circuit and a decoder. The new machine would then have the same performance and the same drawbacks as the prior art machine, except that the overall size and cost would be reduced.

The prior art machine has the following drawbacks. To scan the value translated by each encoder it is necessary to send from the microprocessor to the inputoutput circuit a write instruction essentially comprising two bytes and then to send from the microprocessor to the input-output circuit a read instruction essentially consisting of one byte and finally to send from the input-output circuit to the microprocessor a data byte. Four bytes are therefore transmitted in one direction or the other to scan the state of a single encoder. Also, each instruction sent by the microprocessor is preceded by a characteristic start of transaction signal and is followed by a characteristic end of transaction signal.

Scanning four encoders requires four scan cycles initiated by four instructions from the microprocessor.

The manually operated switches constitute two groups separate from the encoders and for which a fifth and sixth scanning cycle are performed and a fifth and sixth data byte are transmitted. Finally, the scanning of all the encoders and switches is followed by idling of all the columns of the matrix, which entails configuring the input-output circuit by means of a write instruction so that none of the matrix columns is scanned by the decoder In all, 26 bytes are transmitted on the data line to scan four encoders and four switches.

To eliminate the effect of encoder and switch contact bounce, a scan is commanded every ten milliseconds. In an embodiment in which the minimum period of the bus clock timing transmission is ten microseconds, the minimum time needed to scan four switches and four encoders is 2.5 milliseconds. The microprocessor therefore devotes one quarter of its time to carrying out the scanning. Also, a non-negligible current flows in the columns of the matrix representing an encoder while the latter is being scanned. Consequently, the overall scanning period has a direct effect on the quantity of energy drawn from the power supply of the electronic circuits of the machine. Also, this scanning mode requires a relatively complex program to be stored in the program store of the microprocessor.

The prior art machine has another drawback due to the want of outputs on the decoder. Using diodes to connect the matrix columns to the decoder output reduces by around 0.7 volt the noise immunity of the input-output circuit ports when they are configured as inputs.

The use of two different processes to transmit motor instructions and scanning instructions leads to the addition of a dedicated line linking the two boards of the machine, increasing by one the number of contacts in the connectors linking the two boards. Also, the size and cost of the main board are increased by the presence of the address decoder and the latching register which are part of the second interface.

Finally, the prior art machine has a drawback due to the want of inputs on the input-output circuit. This leads to limiting to five the number of rows in the matrix. As each encoder constitutes a sub-matrix comprising five rows, all of the rows of the matrix are busied when an encoder is scanned. Consequently, the switches are in two groups, independent of the encoders. The states of the switches are transmitted in two bytes separate from the four bytes transmitting the values translated by the four encoders. Six data bytes are therefore transmitted, each containing four wanted bits at most and stuffing bits. This inefficient filling of the data bytes burdens transactions between the interface board and the main board by increasing the number of data bytes.

An object of the invention is to propose a franking machine in which the input-output interface board comprises a single application specific integrated circuit and which does not have the drawbacks of the prior art machine.

SUMMARY OF THE INVENTION

The present invention consists in a mail franking machine which prints stamps and totals stamp values, comprising:

- a motor and drums carrying digits in relief for printing a stamp;
- a microprocessor for controlling said motor and for totalling the values of stamps printed;
- position encoders connected to respective drums to translate into binary words the values of the digits printed on the stamp and the states of manually operable switches;
- manually operable switches;
- a first interface controlled by instructions from said microprocessor for scanning and transmitting to said microprocessor said values translated by said encoders and the states of said switches; and
- a second interface controlled by instructions from said microprocessor for switching the power supply of said motor;
- in which machine said first interface comprises an application specific integrated circuit including means for scanning and transmitting to said microprocessor said values translated by all said encoders and the states of all said switches of said machine in response to receiving a single instruction from said microprocessor.

The fact that scanning and transmission are initiated by a single instruction for all the encoders and all the switches of the machine considerably lightens the task of the microprocessor. This means that the microprocessor can be used with great efficiency, so that it can carry out other tasks that it would not otherwise be able to carry out or would not be able to carry out so effectively in a prior art machine, for want of time, or can be used at a slower rate to reduce the power consumption of the electronic circuits. What is more, the microprocessor program can be simplified, freeing up space in its program memory for other tasks, or enabling a smaller capacity memory to be used.

The second interface is preferably integrated into the same application specific integrated circuit as said first interface and comprises, shared with said first interface:

- a bus connected to said microprocessor;
- means for filtering signals sent by said microprocessor;
- means for parallelizing binary data received serially;
- address decoder means;
- means for detecting a start of transaction signal and an end of transaction signal sent by said microprocessor;

and, specific to said second interface:

- means for memorizing the status of the motor power supply; and
- at least part of a switching amplifier for switching the motor power supply.

The machine no longer includes on the main board any address decoder and latching register for motor supply switching instructions, because these instructions are conveyed by the same bus and the same application specific integrated circuit as the scanning and transmission instructions. There is no longer any dedicated line for transmitting a motor control signal between the two boards in the machine, so that each of the two boards can carry a four-way connector. Also, the implementation of an application specific integrated circuit provides the opportunity to integrate at least part of the switching amplifier. This feature makes it possible to reduce the size of the connector and the number of components to a greater extent than would be possible with mere integration of the interfaces from the prior art implementation into an application specific integrated circuit.

The application specific integrated circuit preferably includes an internal link connecting said second interface to said first interface to transmit to said microprocessor, at the same time as bits representing said values translated by said encoders and said states of said switches, a bit representing the state of said motor: on or off.

This machine enables the microprocessor to check correct execution of motor power supply switching instructions without needing any additional components, by virtue of a connection internal to the application specific integrated circuit and the use of resources already provided in the application specific integrated circuit to transmit the values translated by the encoders and to transmit the switch states.

The first and second interfaces preferably comprise a shared sequencer in said application specific integrated circuit including means for memorizing four mutually exclusive operating phases:

- an idle phase after each power on or after an idle command sent by said sequencer itself or by said microprocessor;
- an activation phase when said application specific integrated circuit receives a start of transaction signal, said phase enabling detection of an address specific to said application specific integrated circuit and a bit representing either an instruction to scan and transmit said values translated by said encoders and said states of said switches or an instruction to switch the power supply of said motor;
- a scan and transmit phase after an activation phase if said application specific integrated circuit receives, after its address, a bit representing an instruction to scan and transmit said values translated by said encoders and said states of said switches, said phase being followed by a return to said idle phase; and
- a motor control phase following an activation phase when said application specific integrated circuit receives, after its address, a bit representing an order to switch the power supply of said motor on or off.

The sequencer makes the interface board autonomous to some degree, by enabling the execution of a long scanning and transmission phase or control of the motor after a single instruction sent by the microprocessor.

The machine preferably comprises encoders and switches establishing variable connections between rows and columns of a matrix of conductors and said application specific integrated circuit preferably comprises outputs the number of which is at least equal to the number of columns of said matrix and which are connected to respective columns.

This machine does not require any diodes in series with the conductors constituting the columns of the matrix, as each column is connected to an output of the application specific integrated circuit which is independent of the others. The cost and the overall size of the interface board are substantially reduced. This feature also increases by 0.7 volt the noise immunity of the application specific integrated circuit inputs connected to the conductors constituting the rows of the matrix.

The application specific integrated circuit preferably includes a number of inputs connected to matrix rows which is greater than the number of matrix rows to which said encoders are connected, at least one matrix row being connected only to manually operated switches, said encoders and said switches being connected in groups each having a number of outputs at most equal to the number of matrix rows, the outputs of each group being connected to respective rows of said matrix.

This application specific integrated circuit further optimizes the execution of the scanning and transmission phase by increasing the number of usable bits in each data byte sent to the microprocessor.

The invention will now be described in more detail by way of non-limiting example only and with reference to the accompanying diagrammatic drawings.

DETAILED DESCRIPTION OF THE INVENTION

Figure 1:
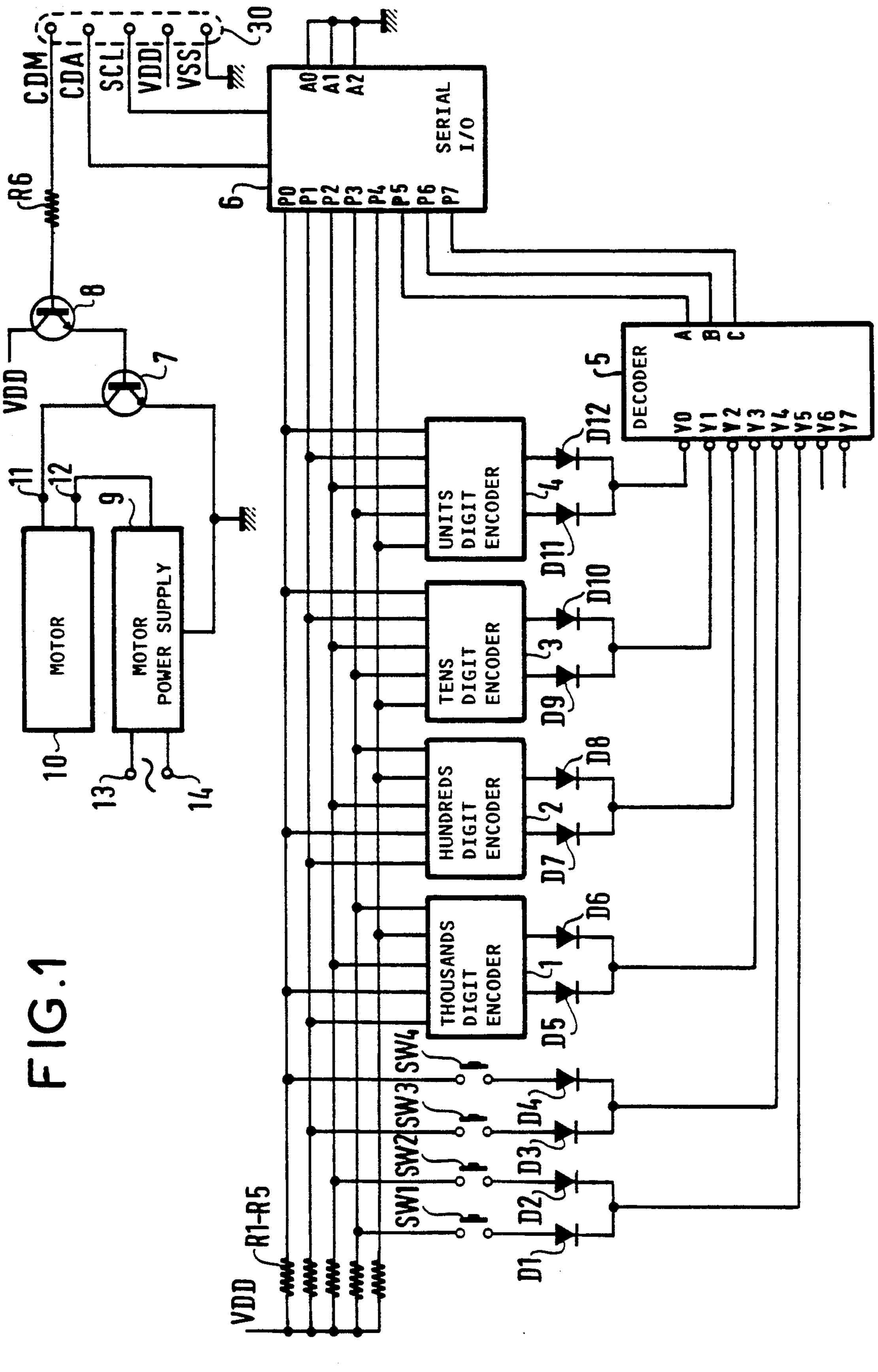
FIG. 1 is a block diagram of one implementation of a prior art m interface board.

The interface board of a prior art machine shown in FIG. 1 comprises:

- four position coders 1 through 4 respectively translating into a binary word: the thousands digit, the hundreds digit, the tens digit and the units digit of the stamp printed by the machine at the time in question;
- four manually operated switches SW1 through SW4;
- an RTC 74HC138 decoder 5;
- an RTC PCF8574 input-output circuit 6;
- two transistors 7 and 8 in a Darlington configuration and a resistor R6 constituting a device for switching the power supply to a motor 10; and
- a power supply circuit 9 for the motor 10.

The motor 10 is connected to the interface board by two terminals 11 and 12. A transformer which is not shown and which is not mounted on the interface board supplies power to the circuit 9 through two terminals 13 and 14. The rest of the interface board is supplied with DC power by the main board, which is not shown. The interface board is connected to the main board by a five-way connector 30.

A motor control line CDM carries a binary signal which controls the transistors 7 and 8 via the resistor R6. A serial data line SDA conveys serial data between the microprocessor and an input of the circuit 6. A clock signal line SCL conveys a clock signal from the microprocessor to the circuit 6 to time the transmission of data in both directions. A power supply line VDD carries a supply voltage of +5 V. A power supply reference line VSS carries a reference potential.

The encoders 1 through 4 and the switches SW1 through SW4 provide variable connections between five rows and 12 columns of a matrix of conductors, each encoder constituting a sub-matrix having five rows and two columns. Each encoder has five terminals connected to the respective lines of the matrix and two terminals connected to the respective columns of the matrix. Each encoder includes two mobile contacts which establish a connection between the first of the two columns of the encoder and one of the five lines and a connection between the second of the two columns and another of the five lines.

When it is scanned, each switch SW1 through SW4 selectively makes a connection between a row of the matrix and a column. The five rows of the matrix are connected to the VDD line at the voltage of +5 V through respective resistors R1 through R5 each of which has a resistance of 2.7 kilohms. An encoder is scanned by connecting the two columns for the encoder to a potential near the reference potential and measuring the potential on the five rows of the matrix. Each encoder encodes a digit from 0 through 9 to provide on the five rows of the matrix a binary word comprising two low levels and three high levels.

Each switch SW1 through SW4 is scanned by connecting the respective column to a potential near the reference potential. If the switch is closed, the row to which the column is connected is at the low level. Otherwise, this row is at the high level.

The serial input-output circuit 6 has eight ports P0 through P7 which can be individually configured as inputs or as outputs, by means of a write instruction sent by the microprocessor. It also has three inputs A0, Al, A2 for defining the address of the circuit 6 as a slave of the microprocessor. In this example these three inputs are connected to the reference potential. The ports P0 through P4 are connected to the five rows of the matrix. The ports P5 through P7 are connected to three inputs A, B, C of the decoder 5.

The decoder 5 has eight complemented outputs Y0 through Y7. Each of these outputs is provided by a CMOS gate. Only one output is at the low level at any particular time. Which one depends on the value of the binary word applied to the inputs A, B, C. The outputs Y0 through Y5 are used to scan the twelve columns of the matrix. The outputs Y6 and Y7 are not connected. One of the two outputs Y6 or Y7 is selected when the microprocessor commands no scanning of any encoder or any switch at the end of a scanning sequence.

Each of the outputs Y0 through Y5 scans simultaneously two columns of the matrix via two diodes so that the two columns remain independent irrespective of the status of the contacts that can connect these two columns to the rows of the matrix. Likewise, the switches SW1 through SW4 are scanned in pairs. In all, the interface board carries twelve diodes D1 through D12 for this purpose. Each diode increases by 0.7 V the potential corresponding to the low state of the rows of the matrix, by adding the 0.7 V voltage drop across them to an existing voltage drop in the order of 0.4 V between the drain and the source of the transistor constituting each of the outputs Y0 through Y5 of the decoder 5. When one of the ports P0 through P4 is configured as an input, the potential on the line connected to this port is interpreted as a low level if it is below 1.5 V, with the result that the noise immunity is equal to 0.4 V. Interference causing an increase in potential on this line of +0.4 V when the ports of the circuit 6 are being scanned therefore results in an erroneous read operation.

The diodes D1 through D12 also increase the number of components on the interface board, as do the two transistors 7 and 8. The separation of the motor control interface into one part on the interface board and one part on the main board requires a link between the two boards provided by the CDM line, representing a 25% increase in the number of contacts of the connector 30.

Communication between the microprocessor and the serial input-output circuit 6 is based on the conventional I2C protocol. A transaction begins when the microprocessor sends a start of transaction signal in the form of a low level on the serial data line SDA when the clock line SCL is stable at the high level. A transaction is completed when the microprocessor sends an end of transaction signal by returning the data line SDA to the high level when the clock line SCL is stable at the high level.

To scan an encoder or a group of two switches the microprocessor first configures the circuit 6 by means of a write operation. For example, to scan the encoder 4 translating the value of the units digit, the ports P0 through P4 are configured as inputs and the ports P5 through P6 are configured as outputs, producing a binary word 000 so that the decoder 5 produces a low level on its output Y0 and high levels on its outputs Y1 through Y7, the output Y0 exciting the two columns of the encoder 4. To set up this configuration the microprocessor sends a start signal, then a byte made up of the seven bits of the specific address of the circuit 6 and a read or write command bit and then a data byte which commands the configuration of the ports P0 through P7. Before transmitting this data, the microprocessor checks that it receives an acknowledge signal sent by the circuit 6 in the form of a low level during the ninth clock period. Likewise, the microprocessor checks that it receives an acknowledge signal after sending the data byte. It then sends the end of transaction signal.

The microprocessor then instructs a read operation to read the logic levels on the five ports P0 through P4. To do this it sends a start of transmission signal followed by a byte made up of the seven bits of the address specific to the circuit 6 followed by the readwrite bit indicating a read operation. It then checks that it receives an acknowledge from the circuit 6 in the form of a low level during the ninth clock period. It then receives a byte indicating the logic levels read on the ports P0 through P7, including the relevant ports P0 through P4. The microprocessor then sends an acknowledge and then an end of transaction signal.

A similar sequence is started to scan the value translated by the tens digit encoder 3, except that the ports P5 through P7 are configured as outputs with different levels so that the decoder 5 scans the encoder 3 instead of the encoder 4. A similar sequence is started to scan the value translated by the encoder 2, then to scan the value translated by the encoder 1, then to scan the state of the switches SW3 and SW4, and then to scan the state of the switches SW1 and SW2. In all, scanning the matrix requires 13 transactions, each representing 20 clock pulses on the SCL line. As the minimum clock period in this embodiment is 10 microseconds, the minimum time to scan all of the encoders and switches is therefore 2.6 milliseconds.

To neutralize the effect of contact bounce, the contacts must be scanned approximately every ten milliseconds. Given these conditions, the microprocessor spends one quarter of its time scanning the encoders and switches. Also, the scanning program includes a large number of instructions because it controls a large number of write and read instructions sent to the interface board. Finally, this circuit has the drawback of consuming some current throughout the scanning period, which is at least 2.6 milliseconds every ten milliseconds. In this embodiment the current during scanning is three milliamperes. The mean power consumption is relatively high as it is directly proportional to the scanning period.

Figure 2:
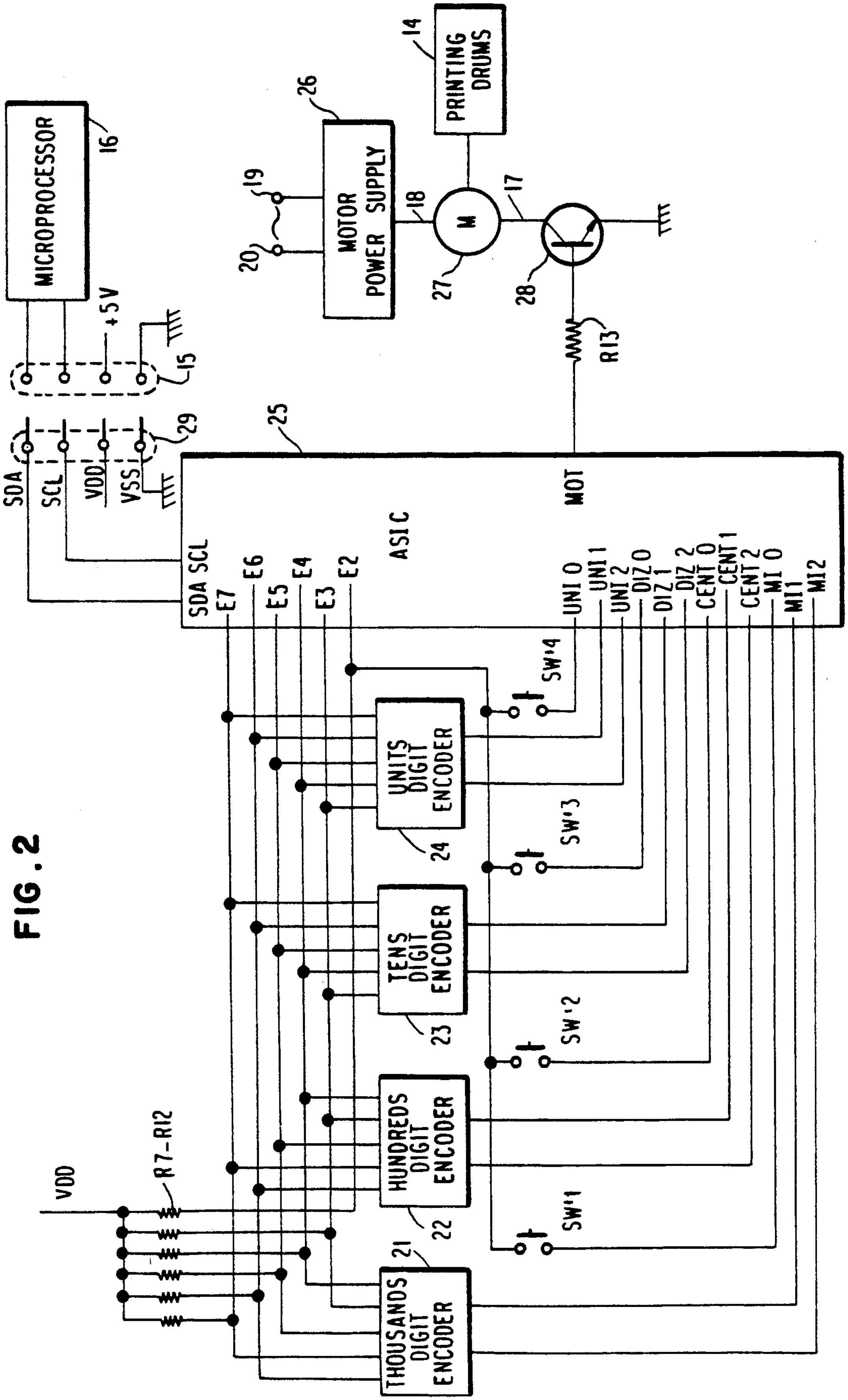
FIG. 2 is a block diagram of one embodiment of a franking machine interface board in accordance with the invention.

FIG. 2 is a block diagram of one embodiment of a franking machine interface board in accordance with the invention. This board comprises:

- four position encoders 21 through 24 analogous to the encoders 1 through 4 previously described and each comprising a sub-matrix of five rows and two columns;
- four switches SW'1 through SW'4 analogous to the switches SW1 through SW4 previously described;
- an application specific integrated circuit 25;
- a power transistor 28;
- a power supply circuit 26 analogous to the power supply circuit 9 described previously, for supplying power to a motor 27.

The interface board is connected to the motor 27 by two terminals 17 and 18 and to a power supply transformer (not shown) by two terminals 19 and 20 which are connected to two inputs of the motor power supply circuit 26. The terminal 17 is connected to the collector of the transistor 28 and the terminal 18 is connected to an output of the power supply circuit 26. The interface board is also connected to a main board carrying a microprocessor 16 by a connector 29.

The main board is represented by the microprocessor 16 and by a connector 15 which plugs into the connector 29. Printing drums 14 are also connected to the motor 27. The main board includes a power supply circuit (not shown) providing a supply voltage of +5 V. The connector 29 has only four contacts.

A serial data line SDA conveys serial data in both directions. A clock signal line SCL is connected to a conductor conveying a clock signal sent by the microprocessor 16 during transactions. A supply voltage line VDD carries a DC supply voltage of +5 V. A supply reference line VSS is connected to a conductor carrying the reference potential.

The ASIC 25 has two inputs respectively connected to the SDA and SCL lines of the connector 29 to communicate with the microprocessor 16. It also has: six inputs E2 through E7 connected to respective rows of a matrix of conductors; an output MOT connected to the base of the transistor 28 through a resistor R13; and outputs UN10, UN11, UN12, DIZ0, DIZ1, DIZ2, CENT0, CENT1, CENT2, M10, MI1, MI2 connected to respective columns of the matrix. Each of the encoders 21 through 24 has two terminals connected to respective columns of the matrix and five second terminals connected to respective rows of the matrix, the sixth row being independent of the encoders but common to the four switches SW'1 through SW'4.

Each of these switches is connected to a separate column and makes a connection between this column and the sixth row of the matrix. The six rows of the matrix are connected to the supply voltage by respective resistors R7 through R12 each of 1.2 kilohms. The circuit does not include any diodes because each column of the matrix is scanned by an independent output UN10 through M12 of the ASIC 25. This eliminates the drawbacks of the cost, size and reduced noise immunity associated with the diodes D1 through D12 of the interface board previously described.

The outputs UNI0 through MI2 are respective open-drain MOS transistors and the MOT output is a complementary pair of MOS transistors.

The ASIC 25 has three main functions, respectively triggered by three instructions sent by the microprocessor 16 using the I2C protocol: an instruction to start the motor; an instruction to stop the motor; and an instruction to scan all the encoders and all the switches.

Figure 3:
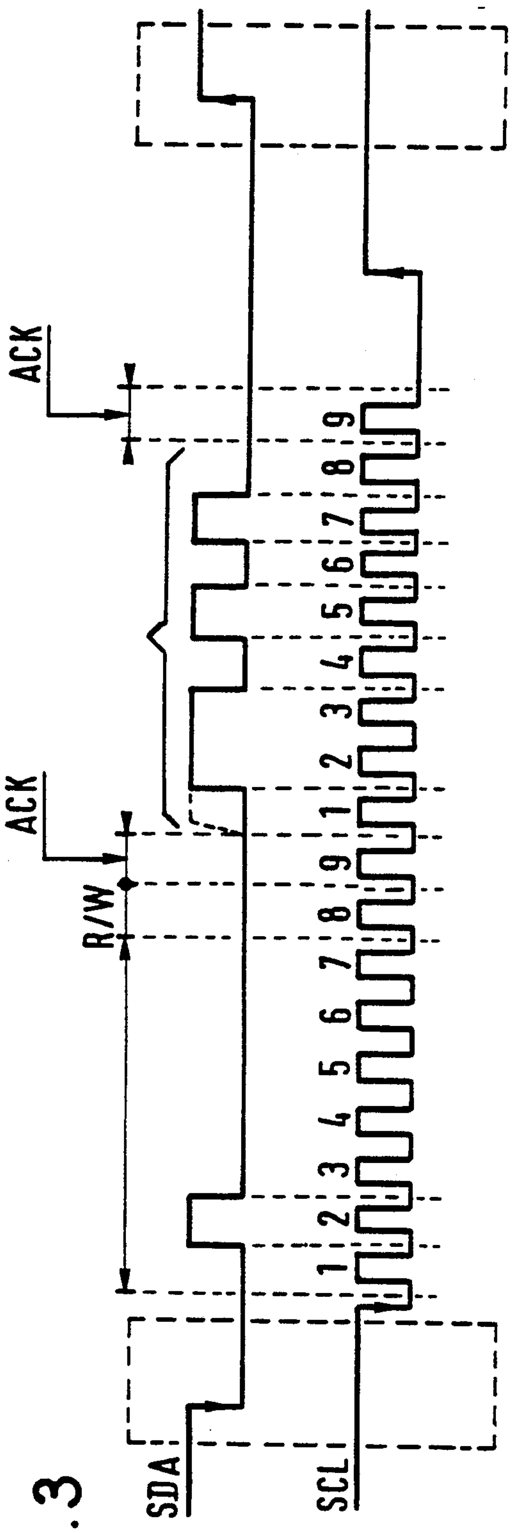
FIG. 3. is a timing diagram for the transmission of an instruction to start or stop the motor for this embodiment of the invention.

FIG. 3 is a timing diagram of the transaction between the microprocessor 16 and the circuit 25 constituting an instruction to start the motor, replacing the connection provided by the CDM line in the prior art interface board previously described. The transaction begins with a start signal when the SDA line goes to the low state when the SCL line is stable in the high state. The microprocessor 16 then sends a seven-bit address specific to the integrated circuit 25 followed by a read-write bit R/W during an eighth clock period. In this case the R/W bit is a write bit (low level). The circuit 25 responds with an acknowledge ACK in the form of a low level on the SDA line during the ninth clock period on the SCL line.

When the microprocessor 16 detects this acknowledge it sends an eight-bit command word with the hexadecimal value 6A or EA to start the motor or a hexadecimal value other than 6A or EA to stop the motor. When it receives this command word the circuit 25 sends an acknowledge ACK in the form of a low level on the SDA line during the ninth clock period, starting from the first bit of the command word. Finally, the microprocessor 16 sends an end of transaction signal in the form of a high level on the SDA line when the SCL line is stable at the high level. The circuit 25 provides a voltage of +5 V or 0 V or thereabouts at its output MOT according to whether the instruction is to start or stop supplying power to the motor 27.

Figure 4:
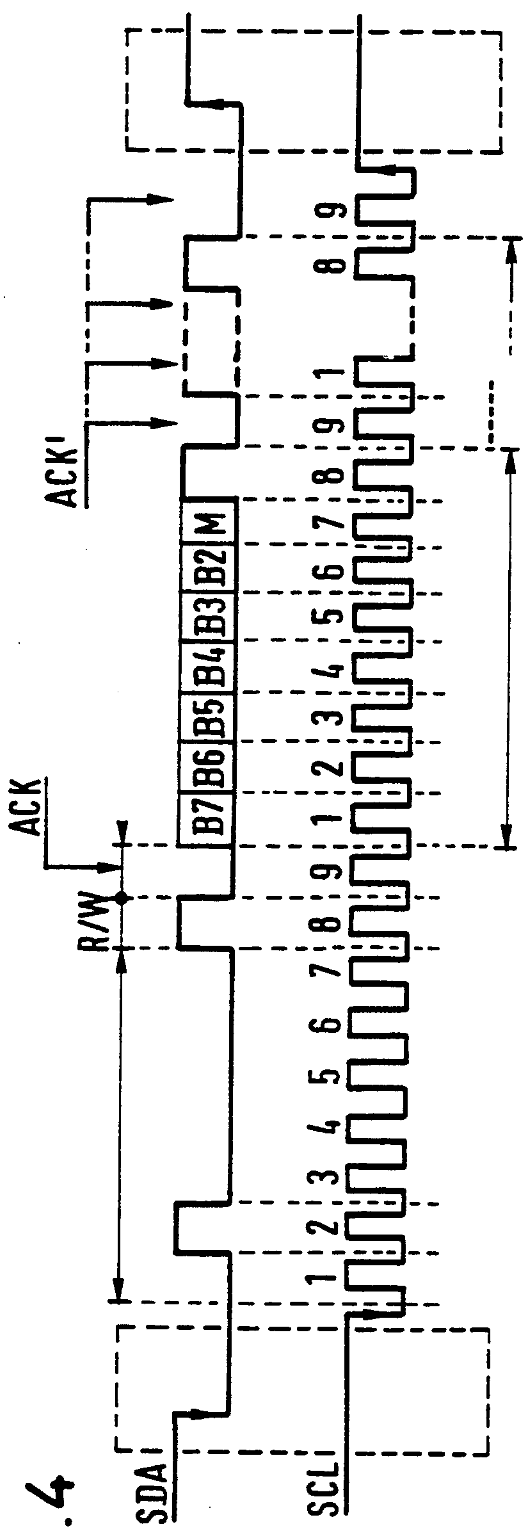
FIG. 4 is a timing diagram for the transmission of a scan and transmit instruction followed by the transmission of to the microprocessor in this embodiment of the invention.

FIG. 4 is a timing diagram of the transaction between the circuit 25 and the microprocessor 16 constituting the scan and transmit instruction and then the actual transmission of the values translated by the encoders 21 through 24 and of the status of the switches SW'1 through SW'4. The microprocessor 16 sends an instruction comprising first a start of transaction signal, then the address of the integrated circuit 25, and then a read-write bit R/W. In this instance this is a read bit in the form of a high level on the SDA line during the eighth clock period on the SCL line. The circuit 25 responds with an acknowledge ACK in the form of a low level on the SDA line during the ninth clock period followed by a first data byte consisting of the bits B7 through B2, M and a stuffing bit. The bits B7 through B2 respectively represent the states of the inputs E7 through E2 when the encoder 21 and the switch SW'1 are scanned by applying a low level to the outputs MI0, MI1 and MI2. The M bit represents the status of the motor power supply.

The microprocessor 16 responds briefly by sending an acknowledge ACK' in the form of a bit at the low level on the SDA line during the ninth clock period on the SCL line, starting from the first data bit. When the circuit 25 receives the acknowledge ACK' it sends a second data byte representing the state of the inputs E7 through E2 when the encoder 22 and the switch SW'2 are scanned in the form of a low level on the outputs CENT0, CENT1 and CENT2 representing the state of the motor power supply.

The microprocessor 16 responds briefly by sending an acknowledge ACK,. On receiving the acknowledge ACK' the circuit 25 sends a third data byte representing the state of the inputs E7 through E2 when the encoder 23 and switch SW'3 are scanned by applying a low level to the outputs DIZ0, DIZ1 and DIZ2 representing the state of the motor power supply.

The microprocessor 16 responds by sending an acknowledge ACK' On receiving the acknowledge ACK, the circuit 25 sends a fourth data byte representing the state of the inputs E7 through E2 when the encoder 24 and the switch SW'4 are scanned by placing a low level on the outputs UNI0, UNI1 and UNI2 representing the state of the motor power supply. The microprocessor 16 responds by sending an acknowledge ACK' after which, as there is no further data to transmit, it sends an end of transaction signal. The transaction comprises five bytes rather than 26.

The number of inputs E2 through E7 connected to the rows of the matrix has been increased relative to the number of ports P0 through P4 configured as inputs in the prior art interface board. This has increased the number of rows of the matrix from five to six. As a result, the encoders and the switches are scanned in groups each comprising one encoder and one switch in this example. This makes it possible to minimize the number of data bytes to be transmitted to the microprocessor, as each data byte includes six wanted bits instead of five. In this example, four bytes are sufficient to transmit the data obtained by scanning. The transaction therefore comprises five bytes rather than seven were the switches to constitute two groups separate from the encoders, as in the prior art.

If the clock period on the SCL line is ten microseconds, scanning takes less than 0.5 milliseconds, a reduction compared with the prior art machine previously described by a factor of five.

What is more, scanning the state of an encoder and a switch does not last the duration of sending a byte but only the duration of a clock period preceding this transmission, in other words its duration is only ten microseconds. In this example the encoders therefore consume current only for $4\times10$ microseconds, that is 0.04 milliseconds, as compared with 2.6 milliseconds in the prior art machine. The power consumption of the interface board is therefore substantially reduced.

This reduction in power consumption makes it a simple matter to increase the current carried by each connector line in order to increase the reliability of the contacts when contaminated by oxidation or dust. For this reason the resistors R7 through R12 have a value of 1.2 kilohms instead of 2.7 kilohms. This reduction in their resistance approximately doubles the current carried by each line although there is still a substantial reduction in the power consumption of the interface board.

The scanning period is reduced by a factor of 5 (0.5 millisecond instead of 2.6 milliseconds) which frees microprocessor time. The program controlling the microprocessor is considerably simplified as a single instruction is sufficient to scan all the encoders and switches. The program therefore requires less memory, releasing space for other applications or making it possible to reduce the size of the memory.

Figure 5:
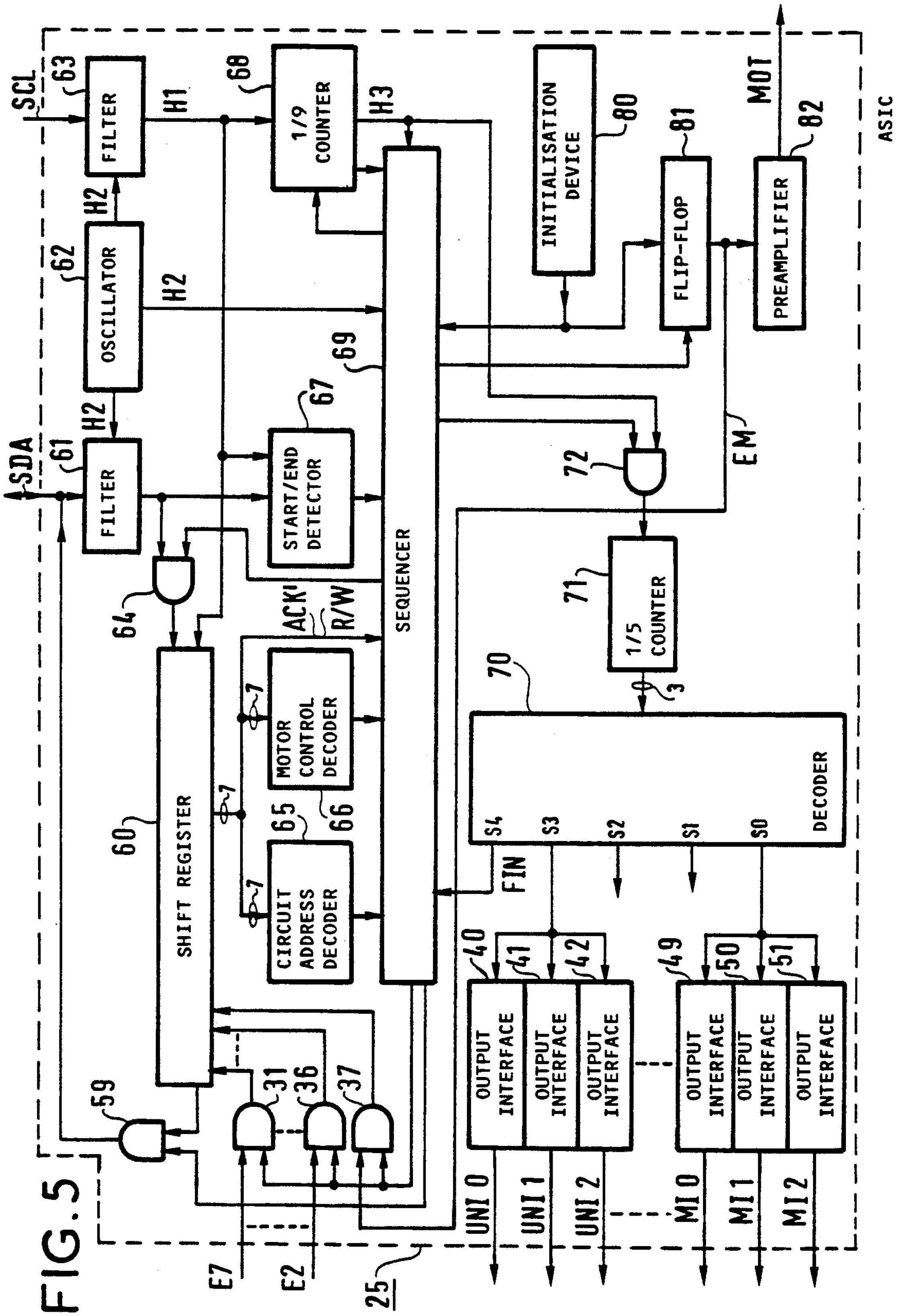
FIG. 5 is a block diagram of the application specific integrated circuit used in this embodiment of r the invention.

FIG. 5 is a block diagram of one embodiment of the application specific integrated circuit 25 implementing the functions previously described. It may be implemented in CMOS technology. It comprises:

- an oscillator 62 in the form of a series of inverters looped to oscillate with a period of approximately 0.1 millisecond;
- two conventional digital filters 61 and 63 with inputs respectively connected to the SDA and SCL lines, to eliminate spurious components of the signals conveyed by these lines;
- a seven-bit shift register 60 which can be written or read in serial or parallel mode;
- a decoder 65 for decoding the address of the ASIC 25;
- a decoder 66 for decoding the command words controlling the motor;
- a circuit 67 for detecting the start and end of transaction signals;
- a 1/9 counter 68;
- a sequencer 69 essentially comprising four flip-flops and logic gates (not shown) for memorizing four exclusive operating phases;
- an initialization device 80 which operates when the circuit 25 is powered on;
- a flip-flop 81 storing the state of the motor power supply;
- a pre-amplifier 82 having an output constituting the output MOT of the circuit 25;
- a 1/5 counter 71;
- a decoder 70 having five outputs of which one is selected by a three-bit word;
- twelve output interfaces 40 through 51 each comprising an open-drain MOS transistor constituting a respective one of the outputs UNI0 through MI2 of the circuit 25; and
- AND gates 31 through 37, 59, 64 and 72.

The clock signal conveyed by the SCL line is filtered by the filter 63 to produce a clock signal H1 which is applied to a clock input of the register 60, a clock input of the detector 67 and a clock input of the counter 68. The oscillator 62 supplies a clock signal H2 to the two filters 61 and 63 and to a clock input of the sequencer 69. The data signal conveyed by the SDA line is filtered by the filter 61 and is then fed to a data input of the detector 67 and to a first input of the AND gate 64.

An output of the detector 67 is connected to an input of the sequencer 69 to which it supplies a logic signal throughout the duration of a transaction. One output of the sequencer 69 is connected to a second input of the AND gate 64 whose output is connected to a serial input of the circuit 60. The register 60 is loaded serially, by enabling the AND gate 64, to load a received address or to load a motor command word at a rate timed by the clock H1. The register 60 has seven stages with seven parallel outputs connected to respective inputs of the decoder 65 and to seven inputs of the decoder 66.

The output of the first stage of the register 60 is connected to an input of the sequencer 69. This output carries the read/write command bit R/W or the acknowledge bit ACK' during some periods of the clock H1.

The register 60 has seven parallel inputs connected to the outputs of the respective AND gates 31 through 37. A first input of each AND gate 31 through 36 constitutes a respective one of the inputs E7 through E2 of the circuit 25. A first input of the AND gate 37 is connected to the output of the flip-flop 81 memorizing the state of the motor power supply, via a line EM internal to the ASIC 25. A second input of each of the AND gates 31 through 37 is connected to an output of the sequencer 69 to command the loading of seven bits in parallel into the register 60.

The decoder 65 and the decoder 66 each have an output connected to a respective input of the sequencer 69. When the decoder 65 recognizes the address of the ASIC 25 it supplies and input signal to the sequencer 69. The register 60 has a serial output connected to a first input of the AND gate 59. A second input of this gate is connected to an output of the sequencer 69 which commands serial transmission to the microprocessor. An output of the AND gate 59 is connected to the SDA line.

The counter 68 has a clock input connected to the output of the filter 63, an enable input connected to an output of the sequencer 69, a first output connected to an input of the sequencer 69 to supply to the latter a pulse during the duration of each eighth period of the clock H representing the reception of an R/W bit, and a second output connected to an input of the sequencer 69 and to a first input of the AND gate 72.

The 1/9 counter 68 counts the pulses of the clock signal H1. Its second output supplies a clock signal H3 comprising one pulse for every ninth pulse of the clock signal H1. Each pulse of the clock signal H3 therefore represents the time interval reserved for the transmission of an acknowledge signal ACK by the circuit 25 or receiving an acknowledge signal ACK' sent by the microprocessor 16.

A second input of the AND gate 72 is connected to an output of the sequencer 69. The output of the AND gate 72 is connected to a clock input of the counter 71.

The 1/5 counter 71 counts five periods of the clock lo H3 to scan successively four groups each comprising one encoder and one switch. It counts a fifth period of the clock H3 with no scanning. The counter 71 has three outputs connected to respective inputs of the decoder 70. This has five outputs of which one is selected at a time, according to the value of the binary word applied to its three inputs. The outputs S0 through S4 are selected in this order when the counter 71 is incremented. The output S0 is connected in parallel to the inputs of the output interfaces 49, 50 and 51 respectively constituting the three outputs MI0, MI1 and MI2 of the circuit 25. Similarly, the outputs Sl, S2 and S3 each commands a group of three output interfaces. The output S4 is connected to an input of the sequencer 69. It supplies a logic signal FIN indicating the end of scanning of the four groups of encoders and switches in order to idle the sequencer 69.

The initialization device 80 has an output connected to an initialization input of the sequencer 69 and to an initialization input of the flip-flop 81 to idle the sequencer 69 and to interrupt the supply of power to the motor 27 when the franking machine is powered on.

The flip-flop 81 has a data input connected to an output of the sequencer 69 to memorize a start or stop instruction. The output of the flip-flop 81 is connected to an input of the pre-amplifier 82. The output of the flip-flop 81 is also connected, within the integrated circuit 25, to a first input of the AND gate 37. The second input of the AND gate 37 and the second inputs of the AND gates 31 through 36 are connected to an output of the sequencer 69 which commands the parallel loading of a seven-bit data word into the register 60, for serial transmission. The power supply state and the motor state are therefore transmitted to the microprocessor 16 in the same byte as the state of the inputs E7 through E2.

The sequencer 69 is idle after initialization by the device 80 at power on or after an end of scanning signal supplied by the output S4 of the decoder 70 or after execution of a motor start or stop instruction or after an end of transaction signal is detected by the decoder 67.

The sequencer 69 is activated immediately a start of transaction signal is detected by the detector 67. It then commands the AND gate 64 in order to load into the register 60 the bits transmitted by the microprocessor 16. It enables the counter 68. At the end of the seventh pulse of the clock H3 the signal at the output of the address decoder 65 is memorized by the sequencer 69. If this signal does not indicate that the address of the circuit 25 has been detected, the sequencer 69 blocks the transmission of an acknowledge ACK and is then idled at the end of the ninth pulse of the clock H3. Otherwise it sends an acknowledge ACK on the SDA line by holding this line at the low level during the ninth period of the clock H3. It then enters the scanning and transmission phase or the motor control phase, depending on the value of the R/W bit supplied to it from the output of the first stage of the register 60 during the eighth period of the clock H3.

If the R/W bit is low, it indicates a motor supply switching instruction. The sequencer 69 then enters a motor control phase. The motor command word is loaded into the circuit 60 and is then decoded by the circuit 66 which supplies a logic signal to the sequencer 69. If the command word has the hexadecimal value 6A or EA the decoder 66 outputs a high level representing starting of the motor. If the command word has any other value the decoder 66 supplies a low level to stop the motor. The output of the sequencer 69 which is connected to a control input of the flip-flop 81 writes into the latter the value of this logic signal. If it is a start instruction, the pre-amplifier 82 provides at the output MOT a current to turn on the power transistor 28.

After decoding the motor command word the sequencer 69 sends an acknowledge ACK to the microprocessor by imposing a low level on the SDA line via the AND gate 59 after which it is idled. The motor continues to run if started or remains at rest if stopped.

If the R/W bit is high, it indicates an instruction to scan all the values translated by the decoders and all the states of the switches, and to transmit these. The sequencer 69 then enters a scanning and transmission phase. For each group comprising one encoder and one switch the decoder 70 selects a group of three output interfaces (40, 41, 42, for example) so as to apply a potential near the reference potential to three columns of the matrix. The sequencer 69 enables the gates 31 through 37, 72 and 59 to load seven data bits in parallel into the register 60 and then to transmit them serially over the SDA line, with an eighth stuffing bit.

The microprocessor 16 sends an acknowledge ACK, in the form of a high level during the clock period after the eight periods used to transmit a data byte. This acknowledge is loaded into the first stage of the register 60 under the control of each ninth pulse of the clock H1. The output of the first stage supplies the acknowledge ACK' to the sequencer 69.

This sequence is repeated for the second, third and fourth groups of encoders and switches.

At the end of scanning the end signal provided by the decoder 70 idles the sequencer 69. If the circuit 25 does not receive an acknowledge ACK' for the first or second or third data byte the sequencer 69 is idled and waits for a new instruction beginning with a start signal.

Transmission of the motor state from the circuit 25 to the microprocessor means that motor control is highly reliable as any transmission error affecting the motor command word is detected quickly, during the next scan, through the M bit which is sent to the microprocessor. Note that the number of values (6A or EA) of the command word starting the motor is very much lower than the number of values (256) stopping the motor. Any disruption of transmission is therefore much more likely to stop the motor then to start it erroneously.

The scope of the invention is not limited to the embodiment described hereinabove, which those skilled in the art may adapt same to scan a different number of encoders and switches or group them differently. The invention may also be adapted to situations in which the microprocessor is connected to the interfaces by a parallel bus rather than a serial bus.

What is claimed is:

1. Mail franking machine which prints stamps and totals stamp values, comprising:
   - a motor and drums carrying digits in relief for printing a stamp;
   - a microprocessor for controlling said motor and for totalling the values of stamps printed;
   - position encoders to encode into binary words said values of the digits printed on the stamp;
   - manually operable switches;
   - a first interface controlled by instructions from said microprocessor for scanning and transmitting to said microprocessor said values encoded by said encoders and the states of said switches; and
   - a second interface controlled by instructions from said microprocessor for switching the power supply of said motor;
   - said first interface comprising an application specific integrated circuit including means for scanning and transmitting to said microprocessor said values encoded by all said encoders and the states of all said switches of said machine in response to receiving a single dedicated instruction from said microprocessor, said instruction dedicated solely to triggering the scanning and transmitting operations performed by said means for scanning and transmitting.

2. Machine according to claim 1 wherein said second interface is integrated into said application specific integrated circuit as said first interface and comprises, shared with said first interface:

a bus connected to said microprocessor;

means for filtering signals sent by said microprocessor;

means for parallelizing binary data received serially;

address decoder means;

means for detecting a start of transaction signal and an end of transaction signal sent by said microprocessor;

and, specific to said second interface:

means for memorizing a status of the motor power supply; and a switching amplifier for switching the motor power supply.

3. Machine according to claim 2 wherein said application specific integrated circuit includes an internal link connecting said second interface to said first interface to transmit to said microprocessor, at the same time as bits representing said values encoded by said encoders and said states of said switches, a bit representing an on/off state of said motor:

4. Machine according to claim 2 wherein said first and second interfaces comprise a shared sequencer in said application specific integrated circuit including means for memorizing four mutually exclusive operating phases:

an idle phase after power is turned on or after an idle command is sent by said sequencer or by said microprocessor;

an activation phase when said application specific integrated circuit receives said start of transaction signal, a phase enabling detection of an address specific to said application specific integrated circuit and a bit representing either an instruction to scan and transmit said values encoded by said encoders and said states of said switches or an instruction to scan and transmit said values encoded by said encoders and said states of said switches or an instruction to switch the power supply of said motor;

a scan and transmit phase after said activation phase if said application specific integrated circuit receives, after its address, a bit representing an instruction to scan and transmit said values encoded by said encoders and said states of said switches, said scan and transmit phase being followed by a return to said idle phase; and a motor control phase following said activation phase when said application specific integrated circuit receives, after its address, a bit representing an instruction to switch the power supply of said motor on or off.

5. Machine according to claim 1 further comprising encoders and switches establishing variable connections between rows and columns of a matrix of conductors and wherein said application specific integrated circuit comprises a plurality of outputs, a number of which is at least equal to the number of columns of said matrix, said plurality of outputs being connected to respective columns.

6. Machine according to claim 5 wherein said application specific integrated circuit further includes a number of inputs connected to matrix rows which is greater than the number of matrix rows to which said encoders are connected, at least one matrix now being connected only to manually operated switches, said encoders and said switches being connected in groups each having a number of outputs at most equal to the number of matrix rows, the outputs of each group being connected to respective rows of said matrix.

* * * * *